United States Patent
Jung et al.

(10) Patent No.: US 8,406,737 B2
(45) Date of Patent: Mar. 26, 2013

(54) MOBILE TERMINAL AND CONTROLLING METHOD THEREOF

(75) Inventors: Gu Wan Jung, Gyeonggi-do (KR); Jae Phil Ki, Seoul (KR)

(73) Assignee: LG Electronics Inc., Seoul (KR)

( * ) Notice: Subject to any disclaimer, the term of this patent is extended or adjusted under 35 U.S.C. 154(b) by 822 days.

(21) Appl. No.: 12/552,374

(22) Filed: Sep. 2, 2009

(65) Prior Publication Data

US 2010/0093397 A1  Apr. 15, 2010

(30) Foreign Application Priority Data

Oct. 13, 2008 (KR) .................. 10-2008-0099977

(51) Int. Cl.
*H04M 1/66* (2006.01)
*H04M 1/68* (2006.01)
*H04M 3/16* (2006.01)

(52) U.S. Cl. ..... 455/411; 455/3.01; 455/3.03; 455/3.04; 455/3.05; 455/3.06; 455/410; 455/418; 455/419; 455/420; 455/557; 455/558; 725/25; 725/27; 725/28; 725/30

(58) Field of Classification Search ........ 455/3.01–3.06, 455/405–411, 418–420, 557–559, 556.1–556.2, 455/41.2; 725/1, 2, 4, 25, 27–31
See application file for complete search history.

(56) References Cited

U.S. PATENT DOCUMENTS

| 6,216,014 B1* | 4/2001 | Proust et al. ............... 455/558 |
| 6,637,027 B1* | 10/2003 | Breslauer et al. ............ 725/25 |
| 7,478,069 B1* | 1/2009 | Ritter et al. ................. 705/52 |
| 7,599,684 B2* | 10/2009 | Kim ............................ 455/418 |
| 8,005,476 B2* | 8/2011 | Karaoguz et al. ........ 455/435.3 |
| 8,045,709 B2* | 10/2011 | Park et al. ................... 380/239 |
| 2005/0047448 A1* | 3/2005 | Lee et al. .................... 370/536 |
| 2006/0189319 A1* | 8/2006 | Houldsworth et al. ..... 455/445 |
| 2007/0261076 A1* | 11/2007 | Puputti ......................... 725/25 |
| 2008/0113651 A1* | 5/2008 | Choi ............................ 455/411 |

* cited by examiner

*Primary Examiner* — Tuan A Tran
(74) *Attorney, Agent, or Firm* — Lee, Hong, Degerman, Kang & Waimey

(57) ABSTRACT

A mobile terminal includes a display, transmitter, memory, and a controller configured to recognize a first SIM card having a first SIM identification that identifies the first SIM card, and to receive access data having conditional broadcast access information via user input, the access data being associated with the first SIM identification. The controller is further configured to store the access data based upon the recognition of the first SIM card in the memory, cause the display to display received broadcast content in accordance with conditions specified by the access data, and delete the access data from the memory after the first SIM card is removed from the mobile terminal.

26 Claims, 10 Drawing Sheets

MOBILE TERMINAL AND CONTROLLING METHOD THEREOF

CROSS REFERENCE TO RELATED APPLICATIONS

Pursuant to 35 U.S.C. §119(a), this application claims the benefit of earlier filing date and right of priority to Korean Application No. 10-2008-0099977 filed on Oct. 13, 2008, the contents of which are hereby incorporated by reference herein in their entirety.

FIELD OF THE INVENTION

The present invention relates generally to a mobile terminal, and in particular for storing and deleting conditional broadcast access setup information.

DISCUSSION OF THE RELATED ART

A mobile terminal may be configured to perform various functions. Examples of such functions include data and voice communications, capturing images and video via a camera, recording audio, playing music files and outputting music via a speaker system, and displaying images and video on a display. Some terminals include additional functionality which supports game playing, and can also be configured as multimedia players. More recently, mobile terminals have been configured to receive broadcast and multicast signals which permit viewing of contents such as videos and television programs.

Generally, terminals can be classified into mobile terminals and stationary terminals according to their mobility. The mobile terminals can be further classified into handheld terminals and vehicle mountable terminals according to their types of portability.

There are ongoing efforts to support and increase the functionality of mobile terminals. Such efforts include software and hardware improvements, as well as changes and improvements in the structural components which form the mobile terminal.

Recently, as the broadcast receiving function becomes more popular, various broadcast programs tend to be transmitted on more broadcast channels. Some of the various broadcast channels, such as pay channels, adult channels, and the like, are viewable only after user authentication procedures are performed. Since it has become more difficult to determine which prescribed program will be selected from one of the numerous broadcast channels, the demand for a method for selecting a specific broadcast channel more conveniently has increased.

SUMMARY OF THE INVENTION

In accordance with one embodiment, a method for displaying content includes recognizing, at a first mobile terminal, a subscriber identify module (SIM) card comprising a SIM identification that identifies the SIM card; receiving access data comprising conditional broadcast access information via user input, the access data being associated with the SIM identification; storing the access data based upon the SIM identification of the SIM card in memory of the first mobile terminal; transmitting the access data to an external server via a wireless communication network; displaying received broadcast content at the first mobile terminal in accordance with conditions specified by the access data; recognizing the SIM card at a second mobile terminal; transmitting from the second mobile terminal a request comprising the SIM identification of the SIM card to the external server via a wireless communication network; receiving, at the second mobile terminal and responsive to the request, the access data from the external server; storing the access data based upon the SIM identification in memory of the second mobile terminal; and displaying received broadcast content at the second mobile terminal in accordance with conditions specified by the access data received at the second mobile terminal.

In accordance with another embodiment a system includes a first mobile terminal comprising a display, a transmitter, a memory, and a controller, wherein the controller of the first mobile terminal is configured to: recognize a subscriber identify module (SIM) card comprising a SIM identification that identifies the SIM card; receive access data comprising conditional broadcast access information via user input, the access data being associated with the SIM identification; store the access data based upon the SIM identification of the SIM card the memory of the first mobile terminal; cause the transmitter to transmit the access data to an external server via a wireless communication network; cause the display of the first mobile terminal to display received broadcast content in accordance with conditions specified by the access data. The system further comprises: a second mobile terminal comprising a display, a transmitter, a memory, and a controller, wherein the controller of the second mobile terminal is configured to: recognize the SIM card at the second mobile terminal; cause the transmitter of the second mobile terminal to transmit a request comprising the SIM identification of the SIM card to the external server via the wireless communication network; receive responsive to the request, the access data from the external server; store the access data based upon the SIM identification in the memory of the second mobile terminal; and cause the display of the second mobile terminal to display the received broadcast content in accordance with conditions specified by the access data received at the second mobile terminal.

In accordance with yet another embodiment, a method for displaying content includes recognizing, at a first mobile terminal, a subscriber identify module (SIM) card comprising a SIM identification that identifies the SIM card; determining that access data comprising conditional broadcast access information is not located in memory of the first mobile terminal, the access data being based upon the SIM identification and permitting the first mobile terminal to display received broadcast content in accordance with conditions specified by the access data; transmitting from the first mobile terminal a request comprising the SIM identification to an external server via a wireless communication network; responsive to the request, receiving at the first mobile terminal the access data from the external server; storing the access data in memory of the first mobile terminal; and displaying received broadcast content at the first mobile terminal in accordance with conditions specified by the access data.

In accordance with yet another embodiment, a mobile terminal includes a display; a transmitter; memory; and a controller configured to: recognize a subscriber identify module (SIM) card comprising a SIM identification that identifies the SIM card; determine that access data comprising conditional broadcast access information is not located in the memory, the access data being based upon the SIM identification and permitting the mobile terminal to display received broadcast content on the display in accordance with conditions specified by the access data; cause the transmitter to transmit a request comprising the SIM identification to an external server via a wireless communication network; responsive to the request, receive the access data from the external server;

store the access data in the memory; and cause the display to display received broadcast content in accordance with conditions specified by the access data.

In accordance with an alternative embodiment, a mobile terminal includes a display; a transmitter, a memory; and a controller configured to: recognize a first SIM card comprising a first SIM identification that identifies the first SIM card; receive access data comprising conditional broadcast access information via user input, the access data being associated with the first SIM identification; store the access data based upon the recognition of the first SIM card in the memory; cause the display to display received broadcast content in accordance with conditions specified by the access data; and delete the access data from the memory after the first SIM card is removed from the mobile terminal.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Various embodiments of the present invention apply to various types of terminals. Examples of such terminals include mobile as well as stationary terminals, such as mobile phones, user equipment, smart phones, DTV, computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals.

Figure 1:
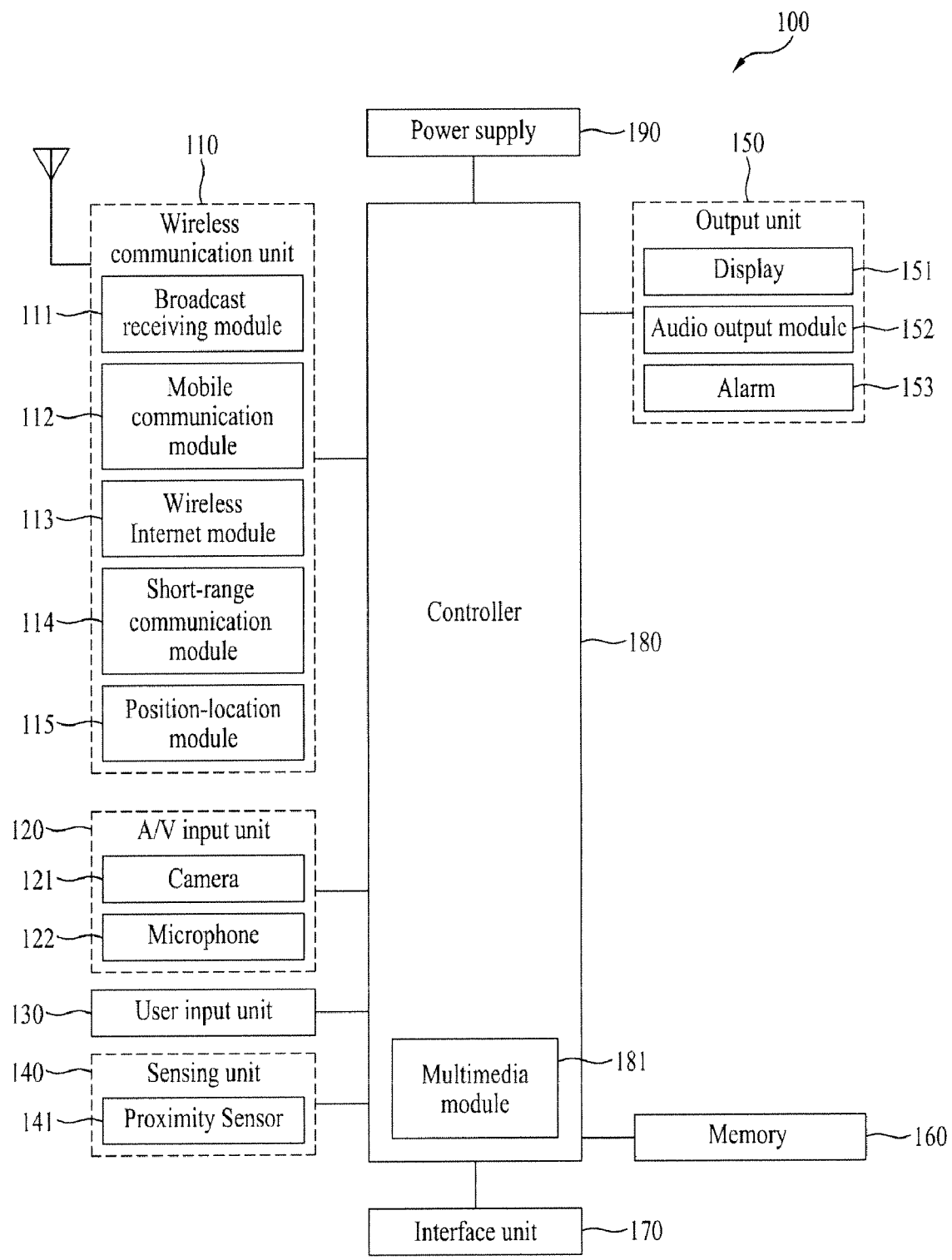
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation. The broadcast receiving module 111 is able to receive broadcast reception restriction information, for example, conditional broadcast access information, via the broadcast network. The conditional broadcast access information will be explained later in this disclosure.

Examples of broadcast associated information include information associated with a broadcast channel, a broadcast program, a broadcast service provider, and the like. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), DVB-CBMS (Digital Video Broadcast Convergence of Broadcast and Mobile Service, OMA-BCAST (Open Mobile Alliance Mobile Broadcast Service Enabler Suite), and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless Internet module 113 supports Internet access for the mobile terminal 100. This module may be internally or externally coupled to the mobile terminal 100. Suitable technologies for wireless internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless Internet module 113 can be replaced with a wire Internet module in non-mobile terminals. The wireless Internet module 113 and wire Internet module may be commonly referred to as an Internet module.

A short-range communication module 114 facilitates relatively short-range communications over a personal area network (PAN). Suitable technologies for short-range communication my include, but are not limited to, near field communication (NFC), radio frequency identification (RFID), infrared data association (IrDA), ultra-wideband (UWB), as well as the networking technologies commonly referred to as BLUETOOTH and ZIGBEE.

A position-location module 115 identifies or otherwise obtains the location of the mobile terminal 100. This module may be implemented using, for example, global positioning system (GPS) components which cooperate with associated satellites, network components, and combinations thereof.

According to current technology, the GPS module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

The microphone 122 receives an external audio signal while the mobile terminal 100 is in a particular mode, such as phone call mode, recording mode or voice recognition mode. This audio signal is processed and converted into digital data.

The A/V input unit 120 typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display 151, which will be described in more detail below.

A sensing unit 140 provides status measurements of various aspects of the mobile terminal 100. For example, the sensing unit 140 may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal 100 with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. The display 151 is typically implemented to visually display information associated with the mobile terminal 100. For example, if the mobile terminal 100 is operating in a phone call mode, the display 151 will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the mobile terminal 100 is in an opened position and a second display 151 configured as an external display viewable in both the open and closed positions.

The touchscreen can be configured to detect a touch input pressure as well as a touch input position and size. Further, a proximity sensor 141 can be provided within or around the touchscreen. The proximity sensor 141 detects an object approaching a prescribed detecting surface or presence or absence of an object existing around itself using an electromagnetic power or infrared rays without mechanical contact. Hence, the proximity sensor 141 is superior to a contact sensor in terms of lifespan and utilization.

Examples for an operational principle of the proximity sensor 141 are explained as follows. First of all, if an object approaches a sensor detecting surface while an oscillation circuit oscillates a sine radio frequency, an oscillation amplitude of the oscillation circuit attenuates or stops. This change is converted to an electric signal to detect presence or absence of the object. Thus, even if any material except a metallic material comes between the RF oscillation proximity sensor and the object, a proximity switch is able to detect the object to detect without interference with the material.

In spite of not providing the proximity sensor 141, if the touchscreen is electrostatic, it can be configured to detect the proximity of a pointer through an electric field change attributed to the proximity of the pointer. In the case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. A position, at which the proximity touch is made to the touchscreen using the pointer, means a position of the pointer vertically corresponding to the touchscreen when the pointer makes the proximity touch.

If the proximity sensor 141 is used, it is able to sense a proximity touch and its pattern such as proximity touch distance, proximity touch direction, proximity touch speed, proximity touch position, proximity touch moving state, and the like. It is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof. The audio output module 152 functions in various modes such as a call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

The memory 160 is generally used to store various types of data to support the processing, control, and storage requirements of the mobile terminal 100. Examples of such data include program instructions for applications operating on the mobile terminal 100, contact data, phonebook data, messages, pictures, and video. Moreover, data for various patterns of vibration and/or sound outputted in the case of a touch input to the touchscreen can be stored in the memory 160. It is able to store the conditional broadcast access information in the memory 160. The conditional broadcast access information will be explained again in this disclosure.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively. The controller 180 is able to recognize loading or unloading of an identity module, which will be explained later, into or from the interface unit 170. When the identify module is unloaded, the controller 180 is able to delete the conditional broadcast access information from the memory 160.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include a folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2A:
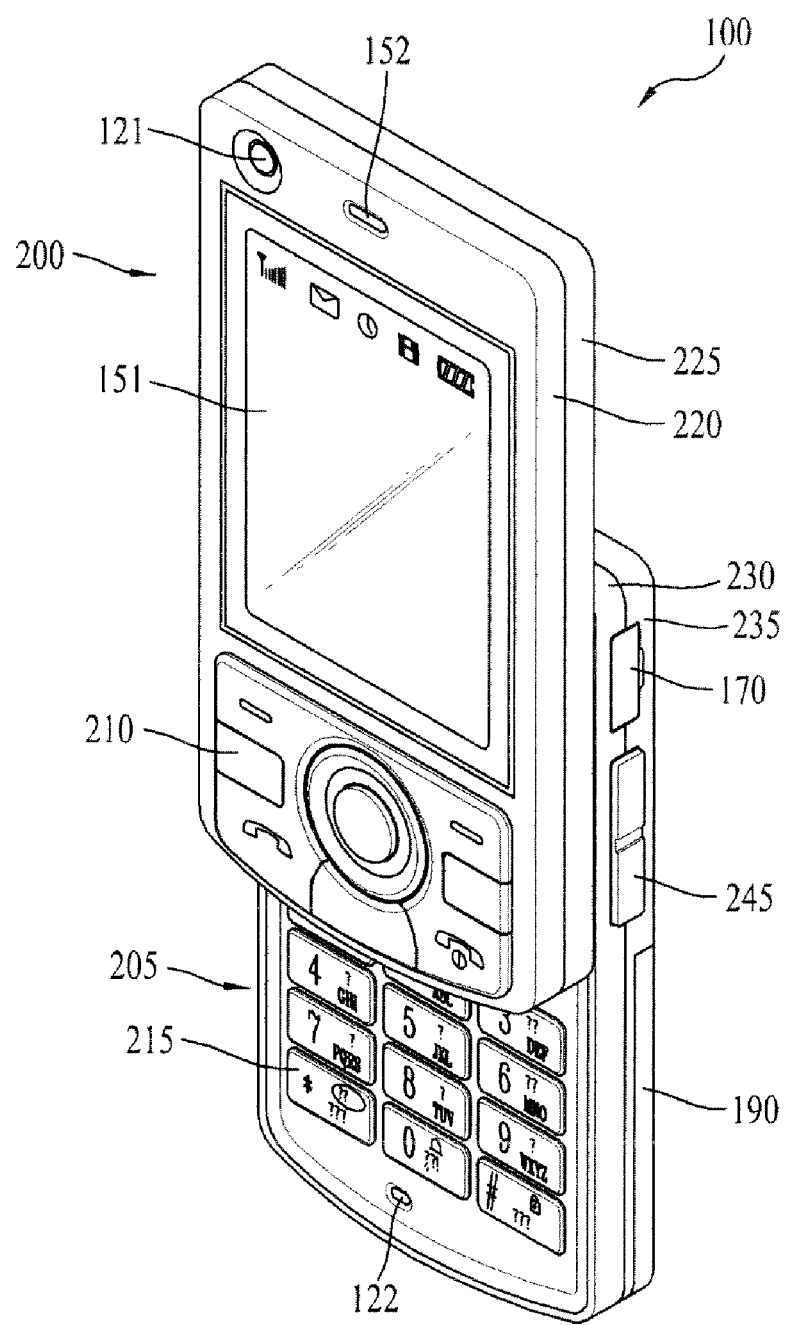
FIG. 2A is a perspective view of a front side of a mobile terminal according to an embodiment of the present invention.

FIG. 2A is a perspective view of a front side of a mobile terminal 100 according to an embodiment of the present invention. In FIG. 2A, the mobile terminal 100 is shown having a first body 200 configured to slidably cooperate with a second body 205.

The user input unit 130 described in FIG. 1 may include a first input unit such as function keys and four directional keys 210, for example, a navigation key, a second input unit such as keypad 215 and a third input unit such as side keys 245. The function keys 210 are associated with the first body 200, and the keypad 215 is associated with the second body 205. The keypad 215 includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal, a first body thereof folds and unfolds relative to a second body thereof between open and closed positions. In addition, in the case of a swing-type mobile terminal, a first body thereof swings relative to a second body thereof between open and closed positions.

In the closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to the first body 200 such as by rotation or swiveling.

The function keys 210 are positioned adjacent to a lower side of the display 151, which is shown implemented as an LCD or OLED. The display 151 may also be configured as a touchscreen having an underlying touchpad which generates signals responsive to user contact with the touchscreen, via a pointer such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys 245 are associated with a particular function of the mobile terminal 100. An interface unit 170 is shown positioned adjacent to the side keys 245, and a power supply 190 in a form of a battery is shown located on a lower portion of the second body 205.

Figure 2B:
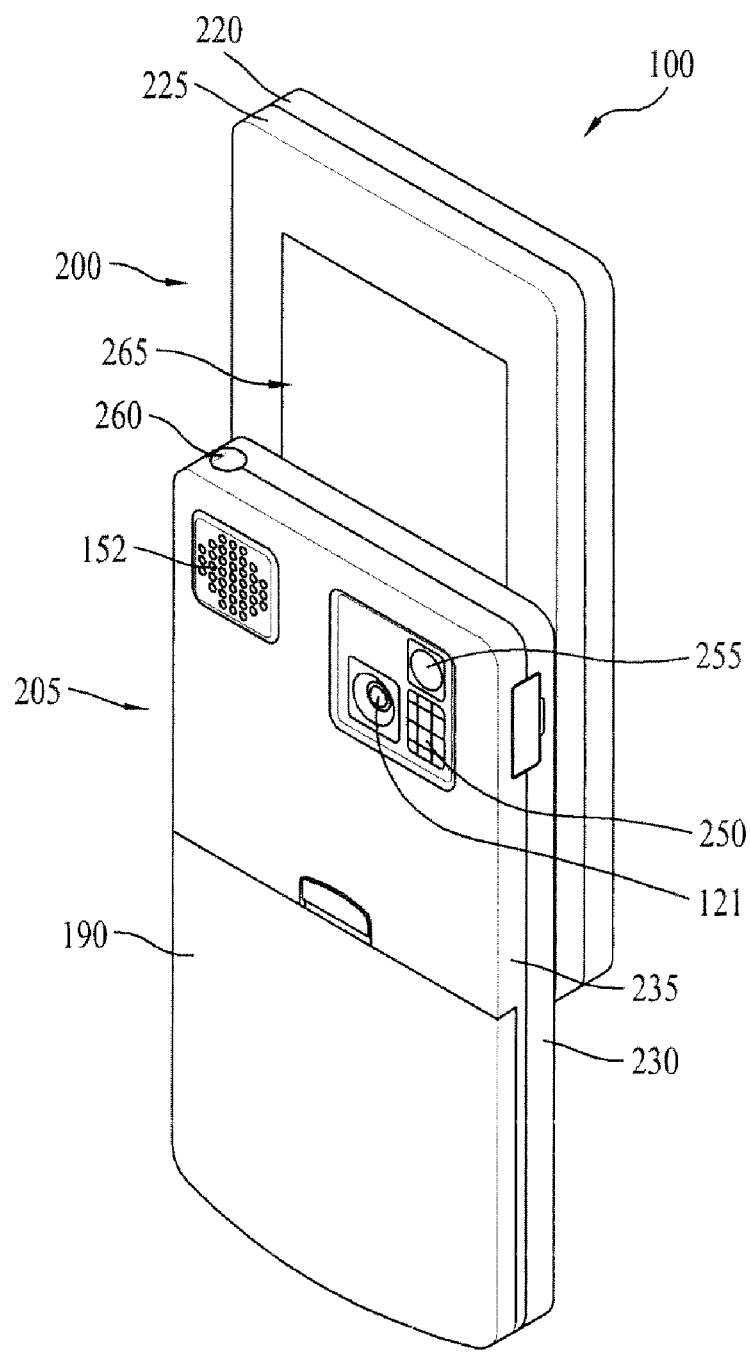
FIG. 2B is a rear view of the mobile terminal shown in FIG. 2A.

FIG. 2B is a rear view of the mobile terminal 100 shown in FIG. 2A. FIG. 2B shows the second body 205 having a camera 121 with an associated flash 250 and a mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 shown in FIG. 2A. Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 shown in FIG. 2B is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111. The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

Figure 3A:
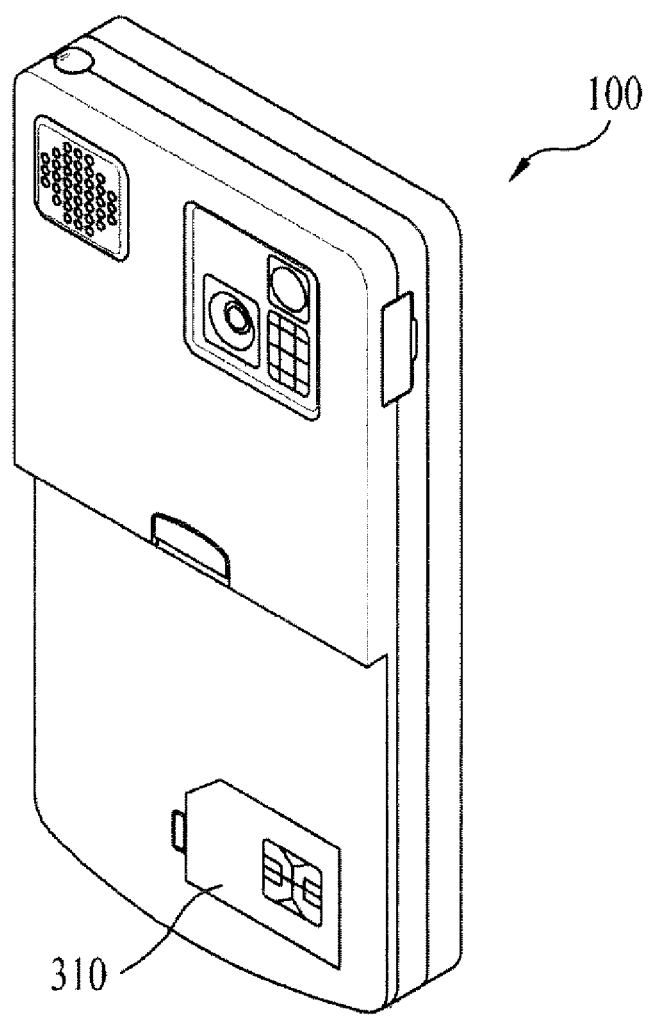
FIG. 3A and FIG. 3B are perspective diagrams of a mobile terminal according to an embodiment of the present invention, in which an identity device is detachably loaded and unloaded, respectively, in/from the mobile terminal.
Figure 3B:
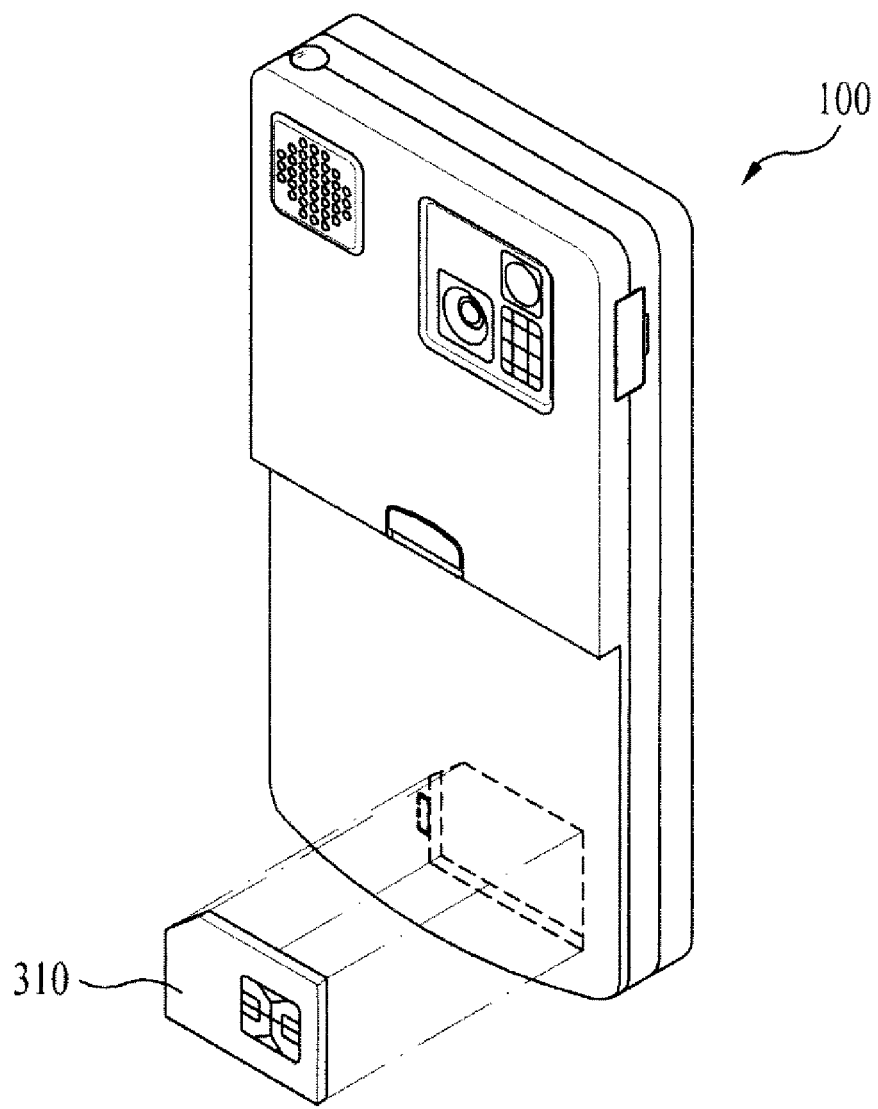

FIG. 3A and FIG. 3B are perspective diagrams of a mobile terminal according to one embodiment of the present invention. As shown in FIG. 3A and FIG. 3B, respectively, the identity device is detachably loaded in the mobile terminal 100 and unloaded from the mobile terminal 100. For example, the identity device includes an SIM card.

Referring to FIG. 3A and FIG. 3B, an identity device 310 is provided detachable from the mobile terminal 100. An old identity device can be replaced by a new identity device by loading the identify device 310 in the mobile terminal 100. Of course, the identity device 310 can be loaded in the mobile terminal 100 by being assembled to an interface unit 170 or by being connected to a connector separately provided for the connection to the identity device 310. Besides, a connecting element for connecting the identity device 310 and the mobile terminal 100 to each other can be provided to any portion, a backside, lateral side, front side, or the like, of the mobile terminal 100.

The mobile terminal 100 of FIG. 1 to FIG. 3B may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
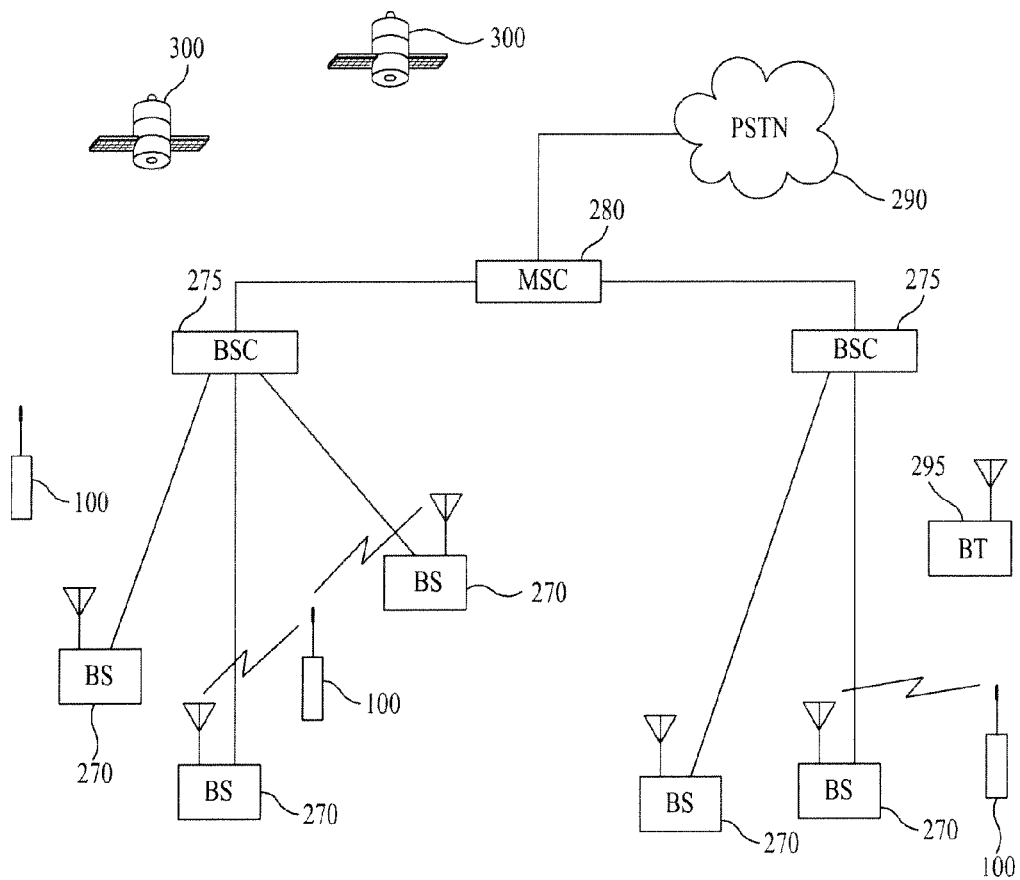
FIG. 4 is a block diagram of a wireless communication system in which a mobile terminal according to an embodiment of the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280. The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum, for example, 1.25 MHz or 5 MHz.

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmission.

During typical operation of the wireless communication system, the base stations 270 receive sets of reverse-link signals from various mobile terminals 100. The mobile terminals 100 engage in calls, messaging, and other communications. Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 control the base stations 270 to transmit sets of forward-link signals to the mobile terminals 100.

A controlling method implemented in the above-configured mobile terminal according to an embodiment of the present invention is explained with reference to the accompanying drawings. The following description is made on the assumption that the mobile terminal 100 normally operates only if a corresponding identity module is loaded in the mobile terminal 100.

In the following embodiment, the description is made referring to two mobile terminals, a first mobile terminal and a second mobile terminal. For clarity of this description, the first mobile terminal is indicated by a reference number 100A and the second mobile terminal is indicated by a reference number 100B. By adding the suffix 'A' to a reference number of each element of the first mobile terminal 100A, the element is referred to an element of the first mobile terminal 100A. By adding the suffix 'B' to a reference number of each element of the second mobile terminal 100B, the element is referred to an element of the second mobile terminal 100B.

Figure 5:
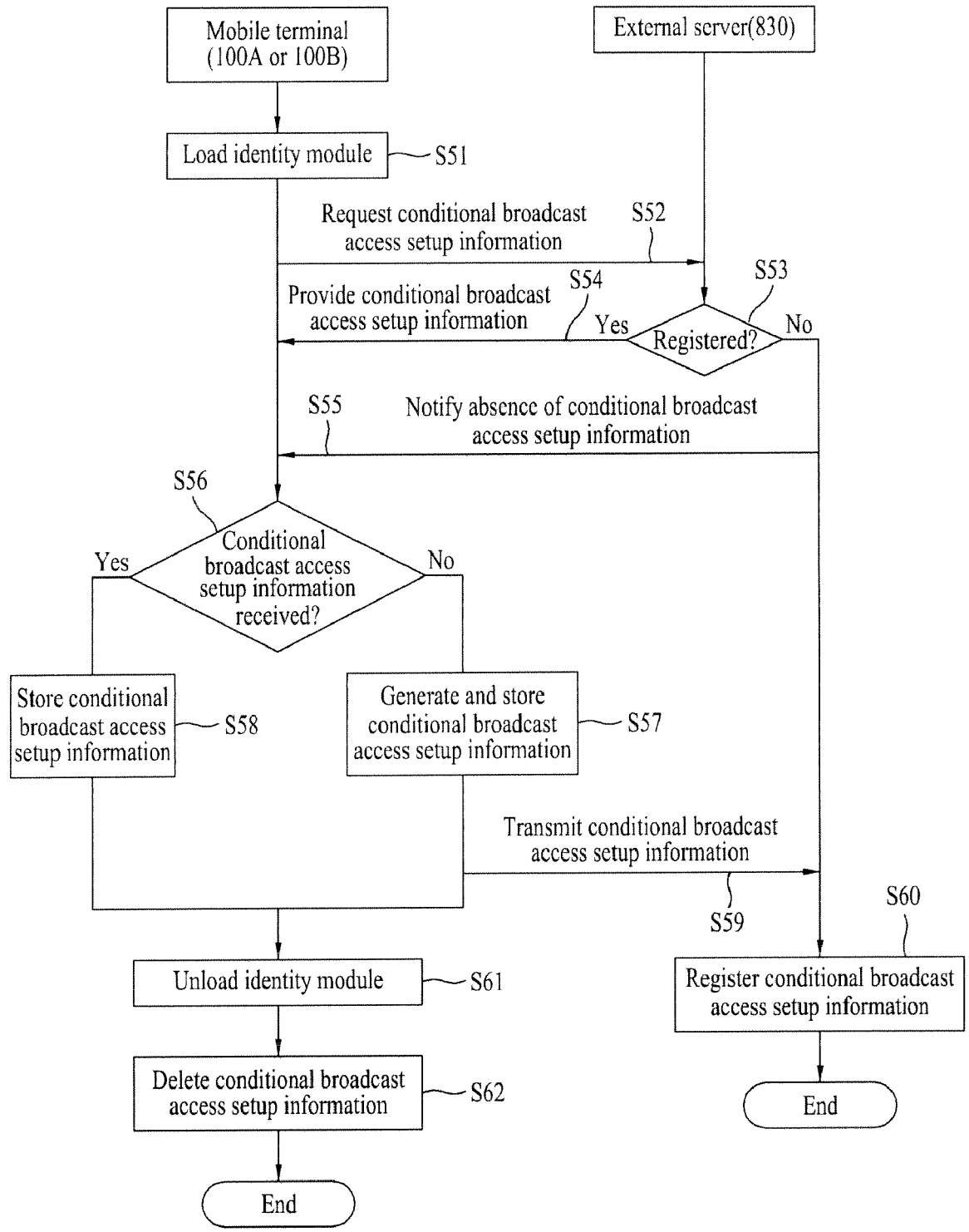
FIG. 5 is a flowchart illustrating controlling a mobile terminal according to an embodiment of the present invention.
Figure 6:
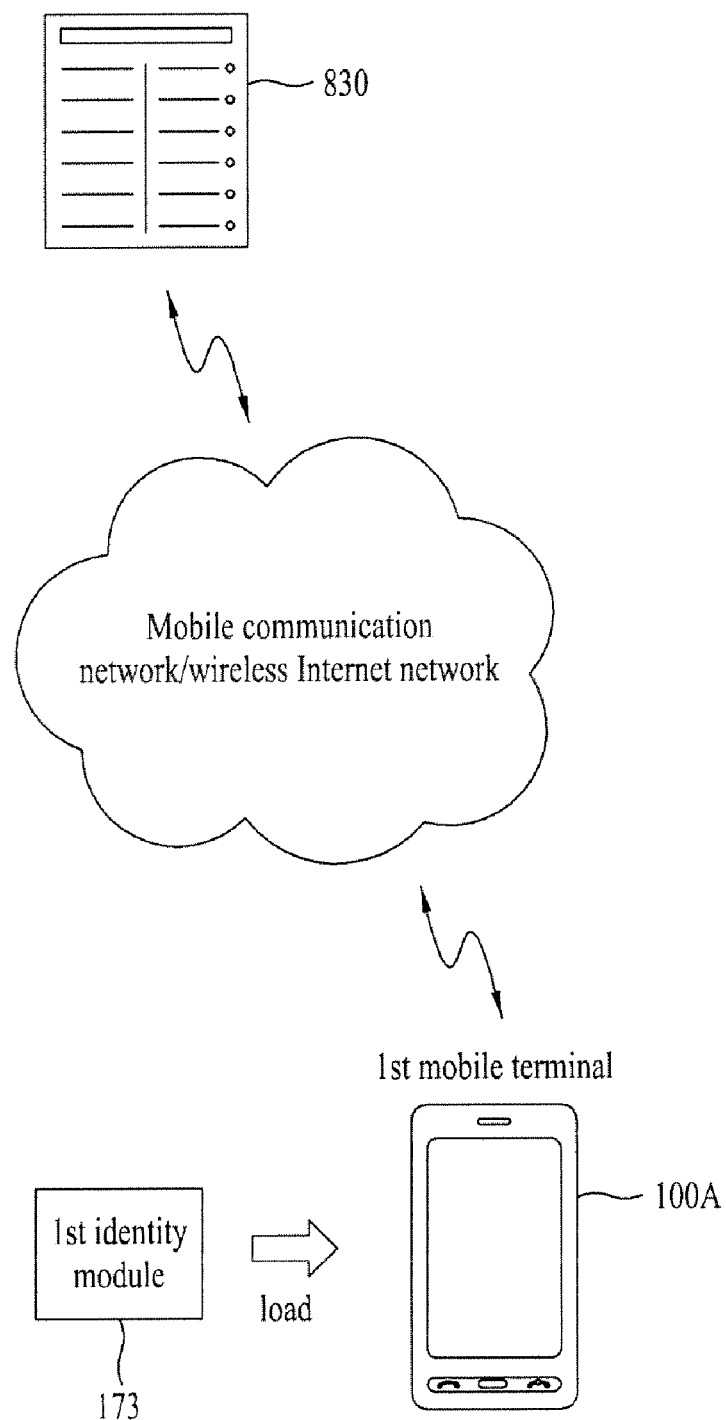
FIG. 6 is a diagram of a system related to the embodiment illustrated in FIG. 5.
Figure 7:
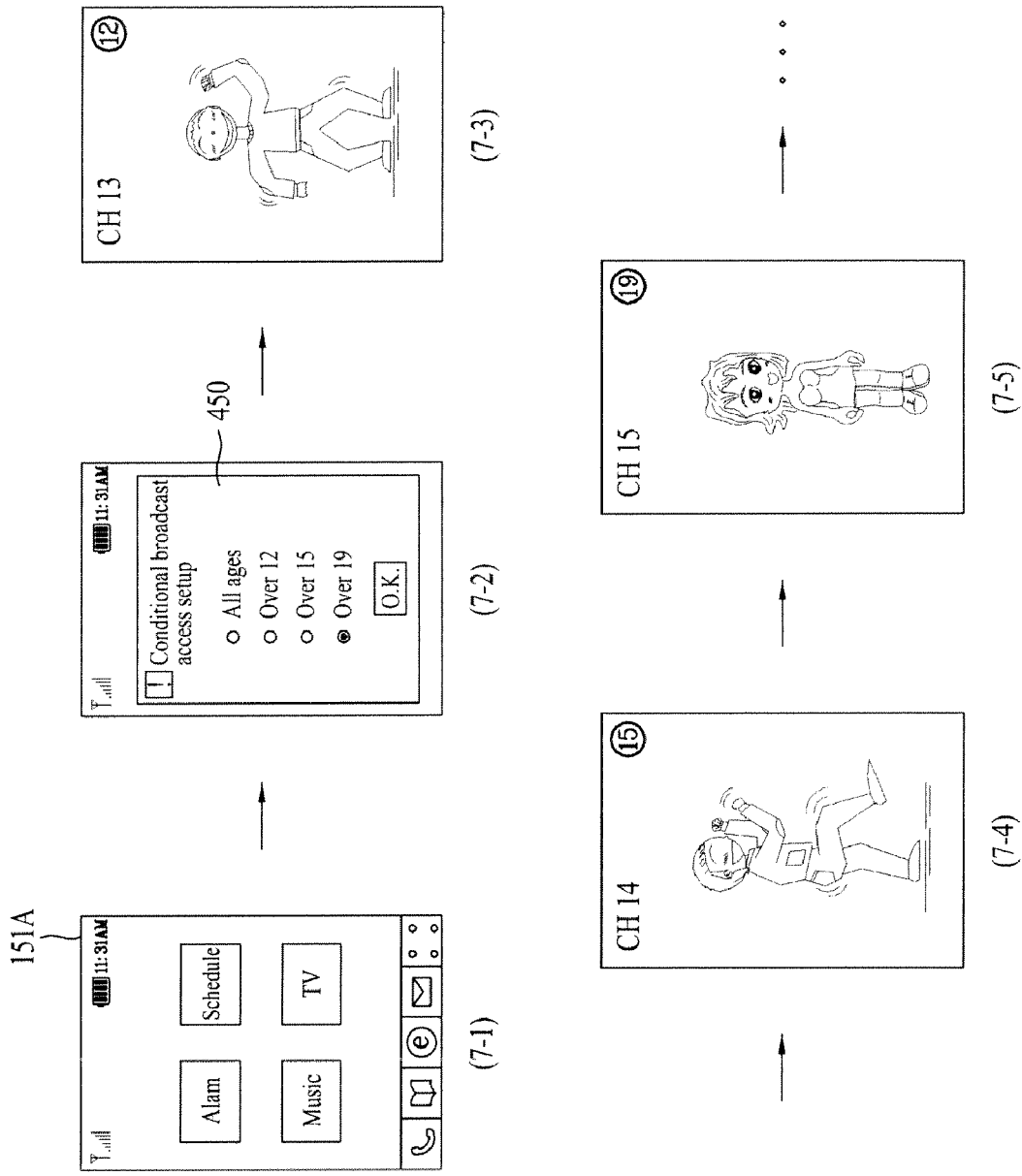
FIG. 7 is a diagram of a display screen on which controlling of a mobile terminal according to an embodiment of the present invention is implemented.
Figure 8:
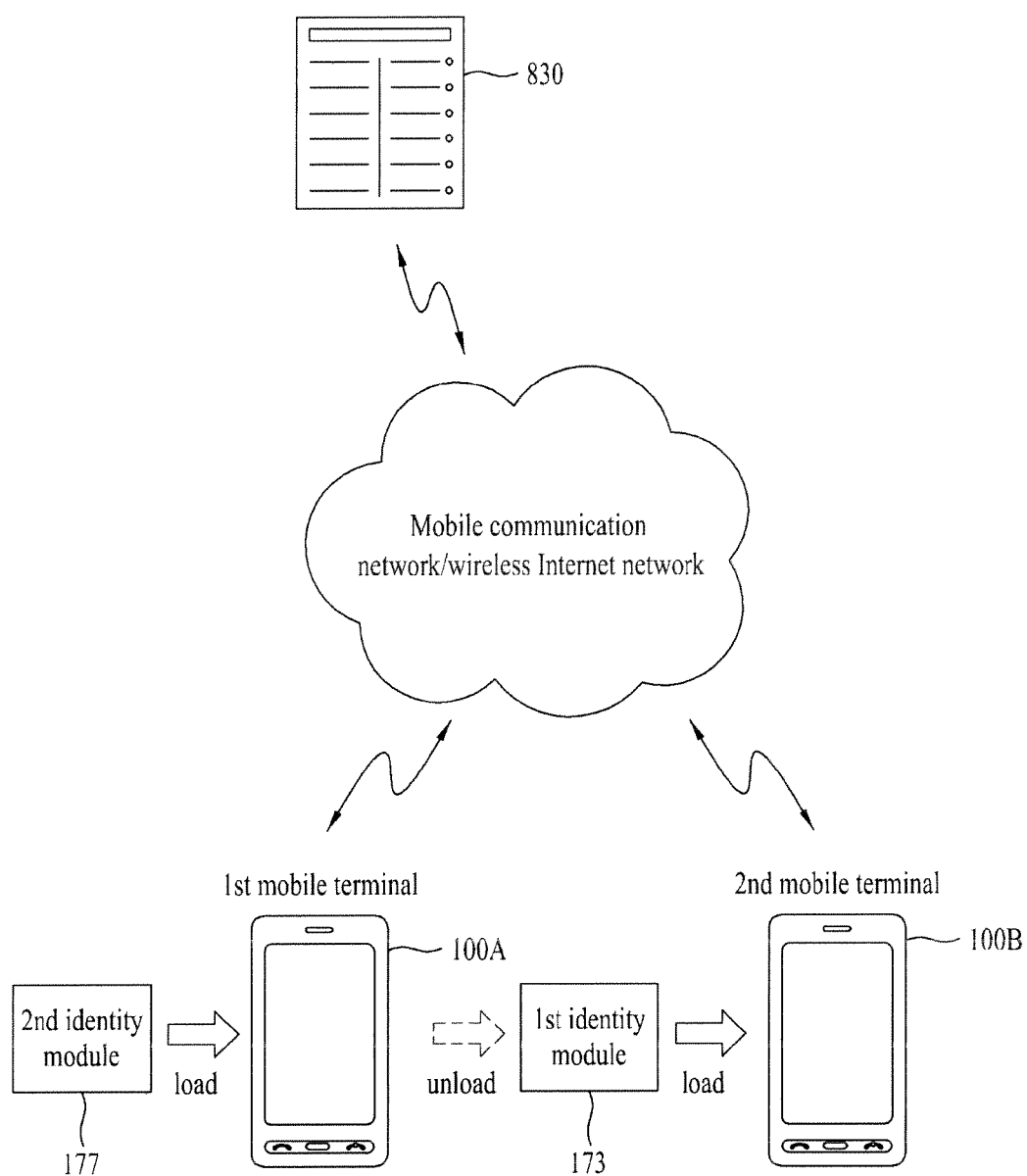
FIG. 8 is a configuration diagram of an alternative system related to the embodiment illustrated in FIG. 5.

A method of controlling a mobile terminal according to an embodiment of the present invention is explained with reference to FIGS. 5 to 9 as follows. FIG. 5 is a flowchart illustrating a method of controlling a mobile terminal according to an embodiment of the present invention. FIG. 6 and FIG. 8 are diagrams of a system related to an embodiment of the present invention. FIG. 7 and FIG. 9 are diagrams of a display screen on which a method of controlling a mobile terminal according to an embodiment of the present invention is implemented.

When the first identity module 173 is loaded onto the first mobile terminal 100A, the first mobile terminal 100A is able to receive a prescribed broadcast channel, and then, outputs a corresponding broadcast. Yet, it is not always possible for the first mobile terminal 100A to output all broadcasts from all broadcast channels even though the first mobile terminal 100A is loaded with the first identity module 173. Even if the first identity module 173 is loaded on the first mobile terminal 100A, a prescribed broadcast channel, such as an adult channel and the like, may not be outputted from the first mobile terminal 100A according to a conditional broadcast access setup related to the first identity module 173. A process for setting up the conditional broadcast access is explained in detail as follows.

In the following description, the identity modules, first identity module 173 and second identity module 177, are assumed as identity modules that are unable to store information related to the conditional broadcast access setup therein. Moreover, it is assumed that the conditional broadcast access setting process has not been performed on the first identity module 173.

First, the first identity module 173 is loaded onto the first mobile terminal 100A and then the power is turned on (S51).

Accordingly, the first mobile terminal 100A displays a corresponding standby picture on the display 151A, as shown in (7-1) of FIG. 7.

Subsequently, the first mobile terminal 100A accesses an external server 830 related to the conditional broadcast access setup. This access can be established via a mobile communication network or a wireless internet network. The first mobile terminal 100A sends first user information, such as a user phone number, IMSI (international mobile station identity), and the like, related to the first identity module 173 to the external server 830 and requests information (hereinafter called "conditional broadcast access setup information") relevant to a first conditional broadcast access setup related to the first user information if there exists the information (S52). In this case, the first user information may include any information capable of identifying and distinguishing the first identity module 173 from other identity modules.

Yet, as mentioned in the foregoing description, since the conditional broadcast access setting process has not been performed on the first identity module 173, the external server 830 fails to have the first conditional broadcast access setup information relevant to the first user information. Therefore, the external server 830 informs the first mobile terminal 100A that the first conditional broadcast access setup information does not exist (S53, S55).

Referring to (7-2) of FIG. 7, the first mobile terminal 100A displays a conditional broadcast access setup window 450 to enable a terminal user to conduct the first conditional broadcast access setup. Accordingly, the terminal user is able to set up conditional broadcast access related to the first identity module 173 through the conditional broadcast access setup window 450 (S56, S57).

For example, the conditional broadcast access setup window 450 shows broadcast ratings, such as "All ages," "Over 12," "Over 15," and "Over 19," to be selected by a user for set up. Optionally, the conditional broadcast access setup window 450 may be displayed before displaying the standby picture shown in (7-1) of FIG. 7 on the display 151.

The conditional broadcast access setup information may be information other than the information relevant to the broadcast ratings. For example, the conditional broadcast access setup information may include a PIN (personal identification number) code for accessing a broadcast channel allowed for conditional access. If the conditional broadcast access related to the first identity module 173 is set up via the conditional broadcast access setup window 450, the setup related information, specifically, the first conditional broadcast access setup information is stored in the memory 160A (S57).

Subsequently, the first mobile terminal 100A transmits the first conditional broadcast access setup information to the external server 830 together with or without the user information according to the first identity module 173 such that the first conditional broadcast access setup information can be registered in the external serve 830 (S59, S60).

Referring to (7-3) to (7-5) of FIG. 7, when a broadcast channel is switched by a terminal user, the first mobile terminal 100A receives broadcast channels to display broadcast channels corresponding to the first conditional broadcast access setup. In the following description, a terminal user unloads the first identity module 173 from the first mobile terminal 100A and then loads it onto the second mobile terminal 100B. This is explained in detail with reference to FIG. 8 as follows.

When the first identity module 173 is unloaded from the first mobile terminal 100A (S61), the controller 180A of the first mobile terminal 100A detects that the first identity module 173 has been unloaded from the interface unit 170A, and then, deletes the first conditional broadcast access setup information related to the first identity module 175 from the memory 160A (S62). In this case, a timing point of deleting the first conditional broadcast access setup information can be set in various ways. For example, it may be configured such that while the power of the first mobile terminal 100A is turned on, if the first identity module 173 is unloaded, the first conditional broadcast access setup information is immediately deleted. Alternatively, while a power of the first mobile terminal 100A is turned off, if the first identity module 173 is unloaded, deleted, or otherwise removed or rendered inaccessible, another identity module, for example, the second identity module 177, is loaded onto the first mobile terminal 100A. Subsequently, when the power of the first mobile terminal 100A is turned on, the first conditional broadcast access setup information may be deleted.

As mentioned in the above description, the first conditional broadcast access setup information is deleted upon unloading of the first identity module 173 from the first mobile terminal 100A. This is to prevent the first conditional broadcast access setup information stored in the memory 160A of the first mobile terminal 100A from being used by an unauthorized party even if the first mobile terminal 100A, from which the first identity module 173 is unloaded, is possessed by the unauthorized party.

In the following description, the case of loading first identity module 173, which has been unloaded from the first mobile terminal 100A, onto the second mobile terminal 100B is explained. When the first identity module 173 is loaded onto the second mobile terminal 100B (S51), the second mobile terminal 100B accesses the external server 830. The second mobile terminal 100B transmits the first user information related to the first identity module 173 to the external server 830 and requests the first conditional broadcast access setup information relevant to the first user information if there exists the information (S52).

As mentioned in the foregoing description, the setup related to the conditional broadcast access has been performed on the first identity module 173 through the first mobile terminal 100A. Therefore, the external server 830 provides the second mobile terminal 100B with the registered first conditional broadcast access setup information (S53, S54). The second mobile terminal 100B is then able to store the first conditional broadcast access setup information in the memory 160B (S56, S58). Therefore, channel switching can be freely performed in the second mobile terminal 100B, as shown in (7-3) to (7-5) of FIG. 7.

Namely, once the conditional broadcast access setup is performed on a specific identity module in one mobile terminal, even if the specific identity module is loaded onto another mobile terminal, it is not necessary to perform an additional conditional broadcast access. If the first identity module 173 is unloaded from the second mobile terminal 100B, as mentioned in the foregoing description, the first conditional broadcast access setup information is deleted from the memory 160B (S61, S62).

Accordingly, this embodiment provides the following effects and/or advantages. First, a terminal user is facilitated to select a specific broadcast channel from a plurality of broadcast channels received by a mobile terminal. Second, if one identity module is transferred from one mobile terminal to another mobile terminal and a conditional broadcast access setup is performed in one mobile terminal, it is not necessary to perform the conditional broadcast access setup in another mobile terminal. Therefore, a specific broadcast channel can be more quickly selected.

In the above description, when the power of the mobile terminal is turned on, the conditional broadcast access is set up. Alternatively, after the power of the mobile terminal has been turned on, the conditional broadcast access may be set up when a broadcast reception menu is entered.

Further, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations, such as transmission via Internet. The computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying content, the method comprising:
    recognizing, at a first mobile terminal, a subscriber identity module (SIM) card comprising a SIM identification that identifies the SIM card;
    receiving access data comprising conditional broadcast access information via user input, the access data being associated with the SIM identification;
    storing the access data based upon the SIM identification of the SIM card in memory of the first mobile terminal;
    transmitting the access data to an external server via a wireless communication network;
    displaying received broadcast content at the first mobile terminal in accordance with conditions specified by the access data;
    recognizing the SIM card at a second mobile terminal;
    transmitting from the second mobile terminal a request comprising the SIM identification of the SIM card to the external server via a wireless communication network;
    receiving, at the second mobile terminal and responsive to the request, the access data from the external server;
    storing the access data based upon the SIM identification in memory of the second mobile terminal; and
    displaying received broadcast content at the second mobile terminal in accordance with conditions specified by the access data received at the second mobile terminal.

2. The method according to claim 1, wherein the SIM card is one of a user authentication module, a subscriber authentication module, or a universal user authentication module.

3. The method according to claim 1, further comprising:
    transmitting the SIM identification to the external server in association with the transmitting of the access data.

4. The method according to claim 1, further comprising:
    deleting the access data from the memory of the first mobile terminal responsive to an unloading of the SIM card from the first mobile terminal.

5. The method according to claim 1, wherein the SIM card is configured to not store the access data.

6. A system, comprising:
    a first mobile terminal comprising a display, a transmitter, a memory, and a controller, wherein the controller of the first mobile terminal is configured to:
        recognize a subscriber identity module (SIM) card comprising a SIM identification that identifies the SIM card;
        receive access data comprising conditional broadcast access information via user input, the access data being associated with the SIM identification;
        store the access data based upon the SIM identification of the SIM card the memory of the first mobile terminal;
        cause the transmitter to transmit the access data to an external server via a wireless communication network;
        cause the display of the first mobile terminal to display received broadcast content in accordance with conditions specified by the access data; wherein the system further comprises:
    a second mobile terminal comprising a display, a transmitter, a memory, and a controller, wherein the controller of the second mobile terminal is configured to:
        recognize the SIM card at the second mobile terminal;
        cause the transmitter of the second mobile terminal to transmit a request comprising the SIM identification of the SIM card to the external server via the wireless communication network;
        receive responsive to the request, the access data from the external server;
        store the access data based upon the SIM identification in the memory of the second mobile terminal; and
        cause the display of the second mobile terminal to display the received broadcast content in accordance with conditions specified by the access data received at the second mobile terminal.

7. The system according to claim 6, wherein the SIM card is one of a user authentication module, a subscriber authentication module, or a universal user authentication module.

8. The system according to claim 6, wherein the transmitter of the first mobile terminal is further configured to transmit the SIM identification to the external server in association with the transmitting of the access data.

9. The system according to claim 6, wherein the controller of the first mobile terminal is further configured to delete the access data from the memory of the first mobile terminal responsive to an unloading of the SIM card from the first mobile terminal.

10. The system according to claim 6, wherein the SIM card is configured to not store the access data.

11. A method for displaying content, the method comprising:
    recognizing, at a first mobile terminal, a subscriber identity module (SIM) card comprising a SIM identification that identifies the SIM card;
    transmitting from the first mobile terminal a request for an access data comprising the SIM identification to an external server via a wireless communication network, wherein the access data is based upon the SIM identification and permits the first mobile terminal to display received broadcast content in accordance with conditions specified by the access data;
    responsive to the request, receiving at the first mobile terminal the access data from the external server;
    storing the access data in memory of the first mobile terminal; and
    displaying received broadcast content at the first mobile terminal in accordance with the conditions specified by the access data.

12. The method according to claim 11, wherein prior to the recognizing, and the transmitting, the method further comprises:
- recognizing the SIM card at a previous mobile terminal;
- receiving the access data comprising the conditional broadcast access information via user input, the access data being associated with the SIM identification;
- storing the access data based upon the SIM identification of the SIM card in memory of the previous mobile terminal; and
- transmitting the access data to the external server via the wireless communication network.

13. The method according to claim 12, further comprising:
- displaying received broadcast content at the previous mobile terminal in accordance with conditions specified by the access data.

14. The method according to claim 11, further comprising:
- deleting after power-on of the first mobile terminal the access data from the memory of the first mobile terminal upon recognizing a second SIM card comprising a second SIM identification at the first mobile terminal.

15. The method according to claim 11, further comprising:
- deleting the access data from the memory of the first mobile terminal after detecting the removal of the first SIM card during a period of time in which the first mobile terminal is powered on.

16. The method according to claim 11, further comprising:
- deleting the access data from the memory of the first mobile terminal responsive to an unloading of the SIM card from the first mobile terminal.

17. A mobile terminal, comprising:
a display;
a transmitter;
a memory; and
a controller configured to:
- recognize a subscriber identity module (SIM) card comprising a SIM identification that identifies the SIM card;
- cause the transmitter to transmit a request for an access data comprising the SIM identification to an external server via a wireless communication network, wherein the access data is based upon the SIM identification and permits the mobile terminal to display received broadcast content on the display in accordance with conditions specified by the access data;
- responsive to the request, receive the access data from the external server;
- store the access data in the memory; and
- cause the display to display received broadcast content in accordance with conditions specified by the access data.

18. The mobile terminal according to claim 17, wherein the controller is further configured to:
- delete after power-on of the mobile terminal the access data from the memory upon recognizing a second SIM card comprising a second SIM identification at the mobile terminal.

19. The mobile terminal according to claim 17, wherein the controller is further configured to:
- delete the access data from the memory after detecting the removal of the SIM card during a period of time in which the mobile terminal is powered on.

20. The mobile terminal according to claim 17, wherein the controller is further configured to:
- delete the access data from the memory responsive to an unloading of the SIM card from the mobile terminal.

21. The mobile terminal according to claim 17, wherein the SIM card is one of a user authentication module, a subscriber authentication module, or a universal user authentication module.

22. The mobile terminal according to claim 17, wherein the transmitter is further configured to transmit the SIM identification to the external server in association with the transmitting of the access data.

23. The mobile terminal according to claim 17, wherein the SIM card is configured to not store the access data.

24. A mobile terminal, comprising:
a display;
a transmitter,
a memory; and
a controller configured to:
- recognize a first SIM card comprising a first SIM identification that identifies the first SIM card;
- receive access data comprising conditional broadcast access information via user input, the access data being associated with the first SIM identification;
- store the access data based upon the recognition of the first SIM card in the memory;
- cause the display to display received broadcast content in accordance with conditions specified by the access data; and
- delete the access data from the memory after the first SIM card is removed from the mobile terminal.

25. The mobile terminal according to claim 24, wherein the controller is further configured to delete after power-on of the mobile terminal the access data from the memory upon recognizing a second SIM card comprising a second SIM identification at the mobile terminal.

26. The mobile terminal according to claim 24, wherein the controller is further configured to detect the removal of the first SIM card during a period of time in which the mobile terminal is powered on.

* * * * *